United States Patent
Walawalkar et al.

(10) Patent No.: US 12,505,663 B2
(45) Date of Patent: Dec. 23, 2025

(54) METHOD FOR COMPRESSING AN AI-BASED OBJECT DETECTION MODEL FOR DEPLOYMENT ON RESOURCE-LIMITED DEVICES

(71) Applicant: CARNEGIE MELLON UNIVERSITY, Pittsburgh, PA (US)

(72) Inventors: Devesh Walawalkar, Pittsburgh, PA (US); Marios Savvides, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 18/266,734

(22) PCT Filed: Jan. 28, 2022

(86) PCT No.: PCT/US2022/014189
§ 371 (c)(1),
(2) Date: Jun. 12, 2023

(87) PCT Pub. No.: WO2022/186925
PCT Pub. Date: Sep. 9, 2022

(65) Prior Publication Data
US 2024/0096085 A1  Mar. 21, 2024

Related U.S. Application Data

(60) Provisional application No. 63/150,777, filed on Feb. 18, 2021, provisional application No. 63/146,780, filed on Feb. 8, 2021.

(51) Int. Cl.
*G06V 10/70* (2022.01)
*G06N 3/082* (2023.01)
(Continued)

(52) U.S. Cl.
CPC .............. *G06V 10/87* (2022.01); *G06N 3/082* (2013.01); *G06V 10/774* (2022.01); *G06V 10/82* (2022.01)

(58) Field of Classification Search
CPC ...... G06V 10/87; G06V 10/774; G06V 10/82; G06N 3/082; G06N 20/00
See application file for complete search history.

(56) References Cited

U.S. PATENT DOCUMENTS

2020/0349711 A1* 11/2020 Duke .................. G06T 7/73
2021/0201661 A1* 7/2021 Al Jazaery ............ G08C 23/00

FOREIGN PATENT DOCUMENTS

CN       111553387       *   8/2020    ............. G06F 18/23
CN       111553387 A          8/2020
(Continued)

OTHER PUBLICATIONS

Wenzheng et al, ("A Lightweight Convolutional Neural Network Flame Detection Algorithm", Faculty of Information Technology Beijing University of Technology Beijing, China, IEEE 2021, pp. 83-86), (hereafter Wenzheng) (Year: 2021).*

(Continued)

*Primary Examiner* — Amara Abdi
(74) *Attorney, Agent, or Firm* — KDW FIRM PLLC

(57) ABSTRACT

Disclosed herein is a method for efficiently reducing the computational footprint of any AI-based object detection model, so as to enable its real-time deployment on computing resource-limited (i.e., low-power, embedded) devices. The disclosed method provides a step-by-step framework using an optimized combination of compression techniques to effectively compress any given AI-based object detection model.

8 Claims, 2 Drawing Sheets

(51) Int. Cl.
*G06V 10/774* (2022.01)
*G06V 10/82* (2022.01)

(56) References Cited

FOREIGN PATENT DOCUMENTS

| CN | 112001477 | * | 11/2020 | ........... G06F 18/214 |
|---|---|---|---|---|
| CN | 112001477 A | | 11/2020 | |
| CN | 112200187 | * | 1/2021 | ........... G06F 18/214 |
| CN | 112200187 A | | 1/2021 | |

OTHER PUBLICATIONS

International Search Report and Written Opinion for the International Application No. PCT/US22/14189, mailed Sep. 22, 2022, 14 pages.
Cai et al., "YOLOv4-5D: An Effective and Efficient Object Detector for Autonomous Driving," IEEE Transactions on Instrumentation and Measurement, vol. 70, No. 4503613: 13 pages (2021).
Hong et al., "A New Semantic Segmentation Network with FPFN and Dense ASPP," In IEEE International Conference on Control, Automation and Information Sciences (ICCAIS): pp. 799-804 (2021).
Written Opinion of the International Preliminary Examing Authority for Application No. PCT/Us2022/014189, mailed Apr. 16, 2024, 6 pages.

* cited by examiner

METHOD FOR COMPRESSING AN AI-BASED OBJECT DETECTION MODEL FOR DEPLOYMENT ON RESOURCE-LIMITED DEVICES

RELATED APPLICATIONS

This application claims the benefit of U.S. Provisional Patent Applications Nos. 63/146,780, filed Feb. 8, 2021, and 63/150,777, filed Feb. 18, 2021, the contents of which are incorporated herein in their entireties.

GOVERNMENT INTEREST

This invention was made with the support of the U.S. Government under contract W911NF20D0002, awarded by the Department of Defense (DoD). The U.S. Government has certain rights in the invention.

BACKGROUND

Low-power, computing resource-limited devices are becoming increasingly pervasive, sophisticated, and important to a number of emerging application domains. These include, for example, environmental sensing, civil-infrastructure monitoring, area surveillance, chip-scale satellites, etc. These types of embedded devices can be deployed in a wide range of environments, including harsh environments like the ocean or space, and are often deployed in environments without access to the power grid. Therefore, these devices rely on batteries and/or energy harvested from the environment to power their sensors, processors, and radios. Energy efficiency is the primary determinant of end-to-end system performance in these types of embedded devices.

Sensors on board resource-limited devices may execute applications that produce rich data sets that require sophisticated processing. Machine learning and advanced digital signal processing are becoming important tools for applications deployed on resource-limited devices. One such application may be, for example, an artificial intelligence (AI) based object detection which uses algorithms that traditionally require a substantial amount of computing resources. In non-resource-limited environments, the computing needs of these algorithms are typically met through high-end graphical processing unit (GPU) hardware. This large computing resource requirement prevents the effective application of these algorithms on low power, resource-limited hardware. However, real-time video-based processing is critical for many types of applications.

This increased need for processing is in tension with the resource-limited domain. The main constraint these systems face is severely limited energy, either due to small batteries or weak energy harvesting, thereby limiting the computing resources available to applications deployed on such devices. One possible solution is to offload processing to a more powerful non-resource-limited device. However, communication takes much more energy than local computation or storage. Often, the only viable solution is to process data locally and transmit only a minimum of filtered/preprocessed data, discarding the rest.

Therefore, it would be desirable to provide an AI-based model capable of recognizing classes of objects that is able to effectively run in computing resource-limited environments.

SUMMARY

Disclosed herein is a method which efficiently reduces the computational footprint of any AI-based object detection model, so as to enable their real-time deployment on computing resource-limited (i.e., low-power, embedded) devices. The disclosed method provides a step-by-step framework using an optimized combination of compression techniques to effectively compress any given state-of-the-art AI-based object detection model.

Compared with the known prior art approaches, the disclosed method preserves better detection model accuracy while providing a superior model compression ratio.

BRIEF DESCRIPTION OF THE DRAWINGS

By way of example, a specific exemplary embodiment of the disclosed system and method will now be described, with reference to the accompanying drawings, in which.

DETAILED DESCRIPTION

AI-based object detection models can be compressed using various different techniques, which focus on different aspects of a given model. Reduction in model inference latency can be achieved by first replacing the backbone low-level feature extractor with a more lightweight counterpart. Second, optimal reduction in the size of the image on which the detection algorithm predicts the objects leads to latency reduction. Third, application of model pruning techniques to efficiently prune redundant parts (filters) of the model is also effective in reducing the model size and thus the inference latency. Based on empirical analysis of different combinations of such compression techniques, an optimal combination and its optimal application order was developed. This ensemble of compression techniques provides high model compression capabilities while keeping the drop in its object detection accuracy to a minimum.

The methodology blueprint which helps efficiently reduce any AI based object detection model and thus enables its real-time edge deployment is presented as follows: Step 1: Create a training dataset with labelled images for every object class of interest; Step 2: Choose an object detection model appropriate for the task; Step 3: Replace the object detection backbone network with a lighter counterpart; Step 4: Reduce the input image size; Step 5: Prune and quantize the model; and Step 6: Deploy the compressed model onto an edge embedded device.

Figure 1:
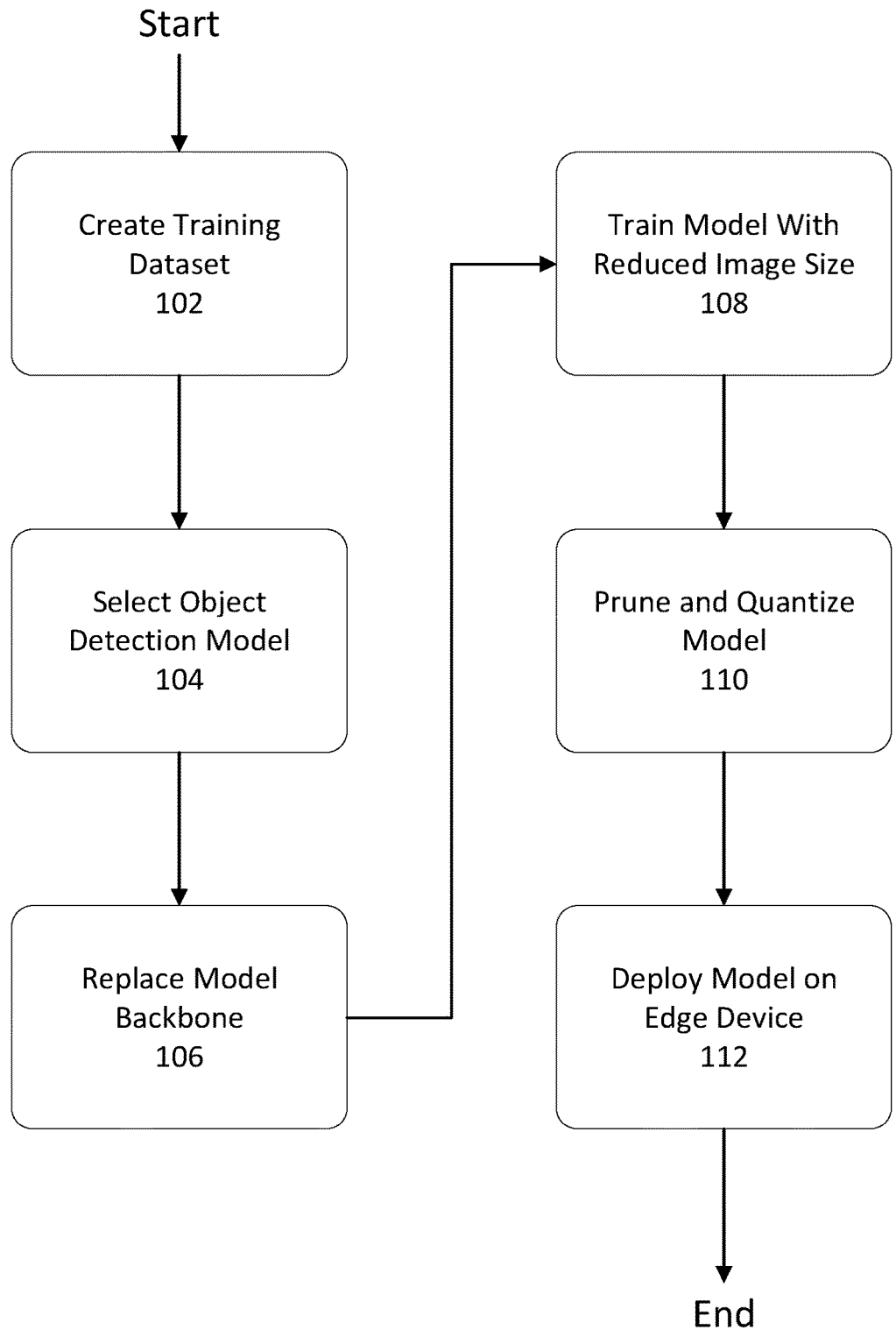
FIG. 1 is a flow chart showing the steps of the method for providing an optimally compressed object detection model.

A further detailed description on each of these steps of the method will now be disclosed. FIG. 1 shows a flow chart showing the steps of the method 100.

Figure 2:
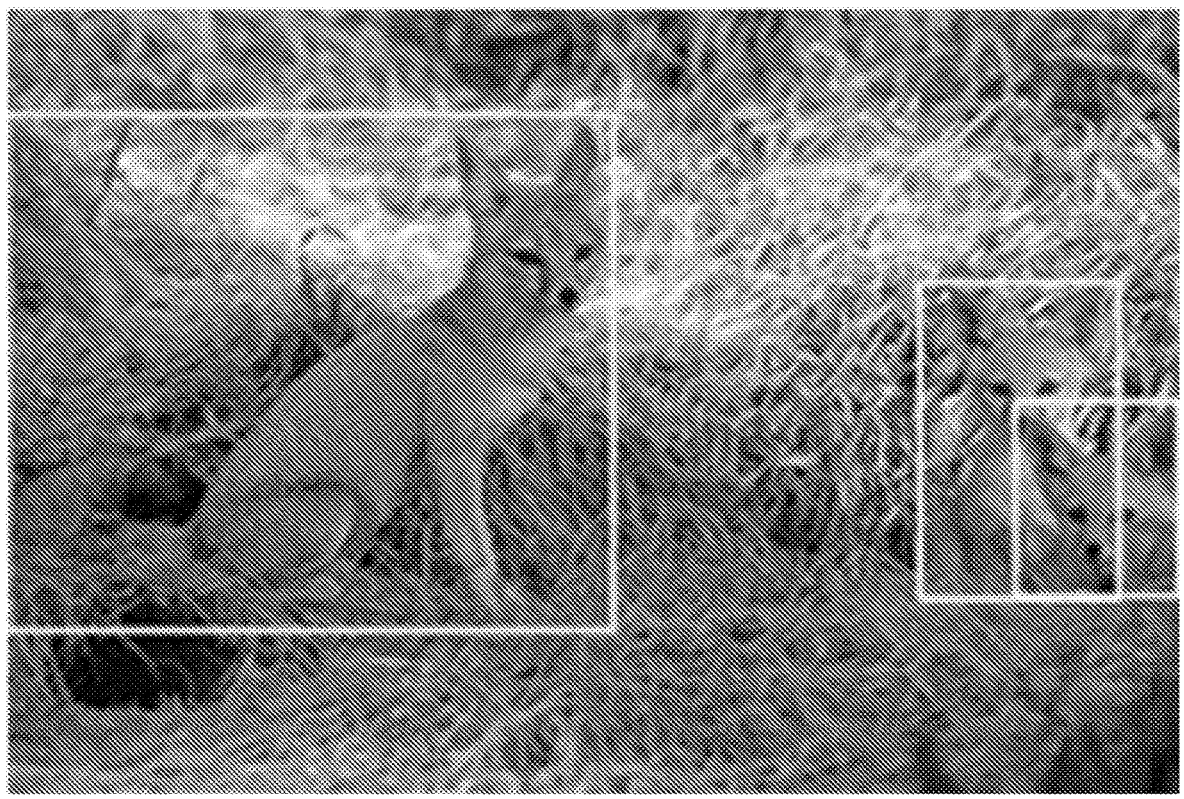
FIG. 2 is an example of an annotated training image.

Training Dataset Creation—This initial step 102 of method 100 comprises the creation of an appropriate training dataset. Preferably, the training dataset comprises a set of images showing one or more instances of objects from the class of interest which have been annotated with bounding boxes put on each object-of-interest in the image. FIG. 2 shows an exemplary training image in which three objects-of-interest of the same class (e.g., foxes) appear. For the object detection algorithm to efficiently learn the object-of-interest, sufficient amounts of training images need to be collected. In case of the above provided image, this would mean collecting images of the object-of-interest in different backgrounds and varied lighting conditions to make the detection algorithm's performance invariant to these factors during the inference stage. Preferably, the training data set will comprise at least 20,000 images containing the object-of-interest. In some embodiments, wherein the model is to be trained on multiple classes, the training dataset will comprise images containing only a single class of objects and images containing multiple classes of objects.

Object Detection Model Selection—Selecting the suitable object detection model for a given detection task at step 104 of method 100 depends primarily on two factors: (1) the number of classes that the model needs to detect and the training images available for each of the classes; and (2) the minimum inference speed required for a particular use case and the inference hardware available.

The first factor dictates the need for a state-of-the-art object detection model for the given use case. A state-of-the-art object detection model generally has a very high computational budget and thus requires a compute resource-rich hardware platform (e.g., a desktop PC/server with a high-end GPU) to run efficiently. Regarding the second factor, if the inference speed requirement is more critical compared to detection accuracy, then an object detection model with a smaller computational budget and a sub state-of-the-art detection accuracy can be selected.

The chosen object detection model may be trained on a diverse training dataset containing many object classes to establish a base set of weights for the model.

Backbone Replacement—In step 106 of method 100, if an object detection model with a high computational budget is required (e.g., in the case of the robust object detection models), then, by using the above mentioned rule-of-thumb, there is a need to efficiently compress components to meet the real-time speed hardware requirements. The first step in a series of three steps is to efficiently compress the model. This is achieved by first replacing the detection backbone network of the model with a much smaller one. The detection backbone is primarily responsible for providing effective features extracted from a given image upon which the detection algorithm further in the model pipeline makes use of to detect and classify an object-of-interest in that image. The detection backbone generally accounts for 60%-70% of the entire model's computational budget and thus provides an ideal and effective avenue to compress the model. The list of backbones with which a given high computational backbone can be replaced with may include, for example, MobileNetv2 or EfficientNet. These models provide effective image feature extraction with a low computational budget. Other models as a substitute for the backbone may also be used.

Like the chosen object detection model, the smaller replacement model may be trained on a diverse training dataset containing many object classes to establish a base set of weights for the model.

Model Training with Image Size Reduction—Step 108 of method 100 to efficiently compress the detection model requires reducing the size of images given to the model both during the training and at the inference (testing) stage. Reducing the input image size given to an object detection model helps reduce the floating point operations per second (FLOPS) during the inference stage, which directly helps increase inference speed. Generally, reducing the input image size by a certain percentage doesn't degrade the detection accuracy significantly unless a given use case involves detecting objects having very small aspect ratios. In one embodiment, reducing the input image size from 224× 224 (which is a standard input size) to 180×180 (a 36% reduction in image size) provides an optimal tradeoff between speed and detection accuracy. In other embodiments, larger or smaller size reductions may provide different trade-off between speed and accuracy. When deployed, for optimal performance, images input to the model should be resized to match the image size of the training dataset.

Pruning and Quantization—Step 110 of method 100 is to apply model pruning and quantization techniques to further reduce the model computational budget. Model pruning is a specialized size reduction algorithm for models based on AI, which ranks the individual layers inside a model on their importance to the overall detection accuracy. This enables the removal of the least significant layers from a model which comparatively have the least effect on a model's detection accuracy. In one embodiment, Network Slimming, a known pruning method, provides a very efficient pruning technique to use in combination with steps 106 (backbone replacement) and 108 (training with reduced size images) of method 100. In other embodiments, any other pruning methods, known or novel, for example, L1 pruning, may be used.

In addition, model quantization is applied to the model. Generally, a model based on AI is implemented using FLOAT32 precision, which is the default precision. The model learned weights do not generally require the entire precision range provided by FLOAT32 and, therefore, the model can be trained using FLOAT16 and INT8 precision techniques. In particular, the use of INT8 provided a very desirable speed vs detection accuracy tradeoff.

In preferred embodiments, optimal compression was realized when pruning was applied before quantization.

Model Edge Deployment—The final step 112 of method 100 is the deployment of the compressed object detection model onto an embedded edge device, for example, the Nvidia Jetson AGX Xavier. This involves setting up the required software platform and libraries required by the model's software framework onto the device. For example, for Nvidia manufactured Jetson devices, the Nvidia SDK manager simplifies this software installation.

Specific hardware requirements may also need to be met, including, for example, providing a stable base for the edge device. For example, in the specific use case of deployment on a drone, the deployment may comprise (1) providing a stable 5V-12V power supply to the edge device; (2) interfacing a high definition camera to the device, both physically through a hardware port, and installing any required software camera drivers onto the edge device operating system. A unit test script is recommended to be run to ensure all hardware and software parts of the system are in place and functioning optimally.

A specific method 100 for compressing an AI-based object detector and deploying it on a computing resource-limited device has been disclosed. Executing the specific steps of method 100 in the specified order provides an optimal performance and trade-off between speed and accuracy of the object detector.

As would be realized by one of skill in the art, method 100 described herein can be implemented by a system comprising a processor and memory, storing software that, when executed by the processor, performs the functions comprising the method.

The invention claimed is:

1. A method for compressing an AI-based object detector comprising:
   creating a training dataset of images with labelled images from one or more object classes of interest, the images having an initial size;
   choosing an object detection model having a backbone component and a detection branch;
   replacing the backbone component of the chosen object detection model with a smaller model;

reducing the size of the images in the training dataset;

training the object detection model on the reduced-size training dataset;

pruning the object detection model using a pruning algorithm;

quantizing the object detection model; and deploying the object detection model;

wherein the object detection model with the smaller model backbone component is first trained on a diverse dataset of images containing many object classes, including both object classes of interest and object classes not of interest, to establish a base set of weights and subsequently trained on the training dataset of reduced size images containing labelled objects from the one or more object classes of interest.

2. The method of claim 1 wherein the smaller model used to replace the backbone of the chosen object detection model is MobileNetv2 or EfficientNet.

3. The method of claim 1 wherein the initial size of the images in the training dataset is 240×240 and further wherein the images are reduced to a 180×180 resolution.

4. The method of claim 1 wherein the size of the images in the training dataset is reduced by at least 30%.

5. The method of claim 1 wherein the pruning algorithm used to prune the object detection model is Network Slimming.

6. The method of claim 1 wherein quantizing the object detection model comprises replacing float32 precision weights with float16 weights, int8 weights or a combination of float16 and int8 weights.

7. A system comprising:

a processor;

memory, storing software that, when executed by the processor, performs the method of claim 1.

8. The method of claim 1 wherein objects in the object classes of interest are labelled in the reduced-size training dataset by placement of the objects in a bounding box.

\* \* \* \* \*